Sept. 27, 1938.  W. B. MARSHALL  2,131,690
SEDIMENTATION APPARATUS
Filed March 5, 1937  3 Sheets-Sheet 1

Inventor
William B. Marshall
By Barker Collings
Attorneys

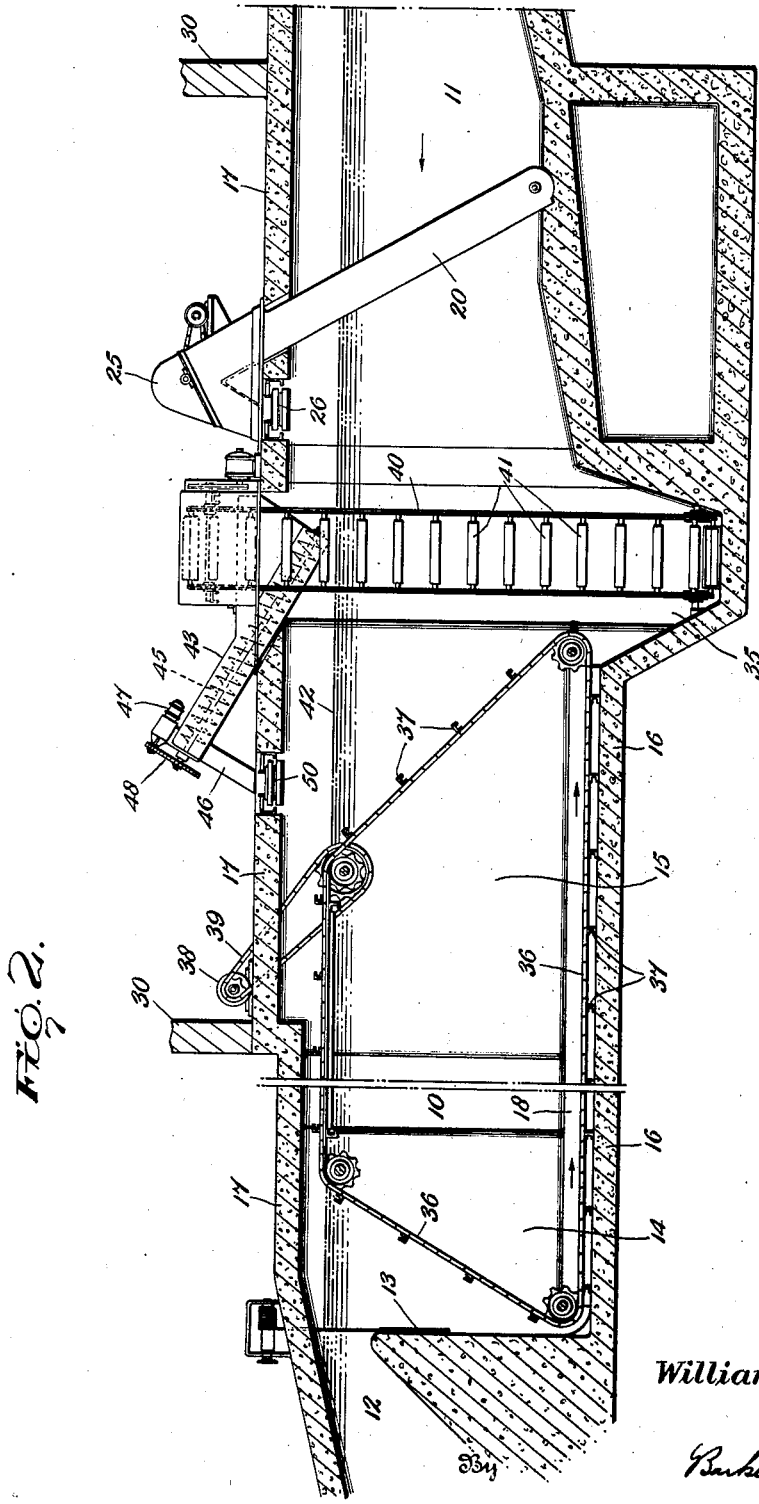

Sept. 27, 1938. W. B. MARSHALL 2,131,690
SEDIMENTATION APPARATUS
Filed March 5, 1937 3 Sheets-Sheet 3
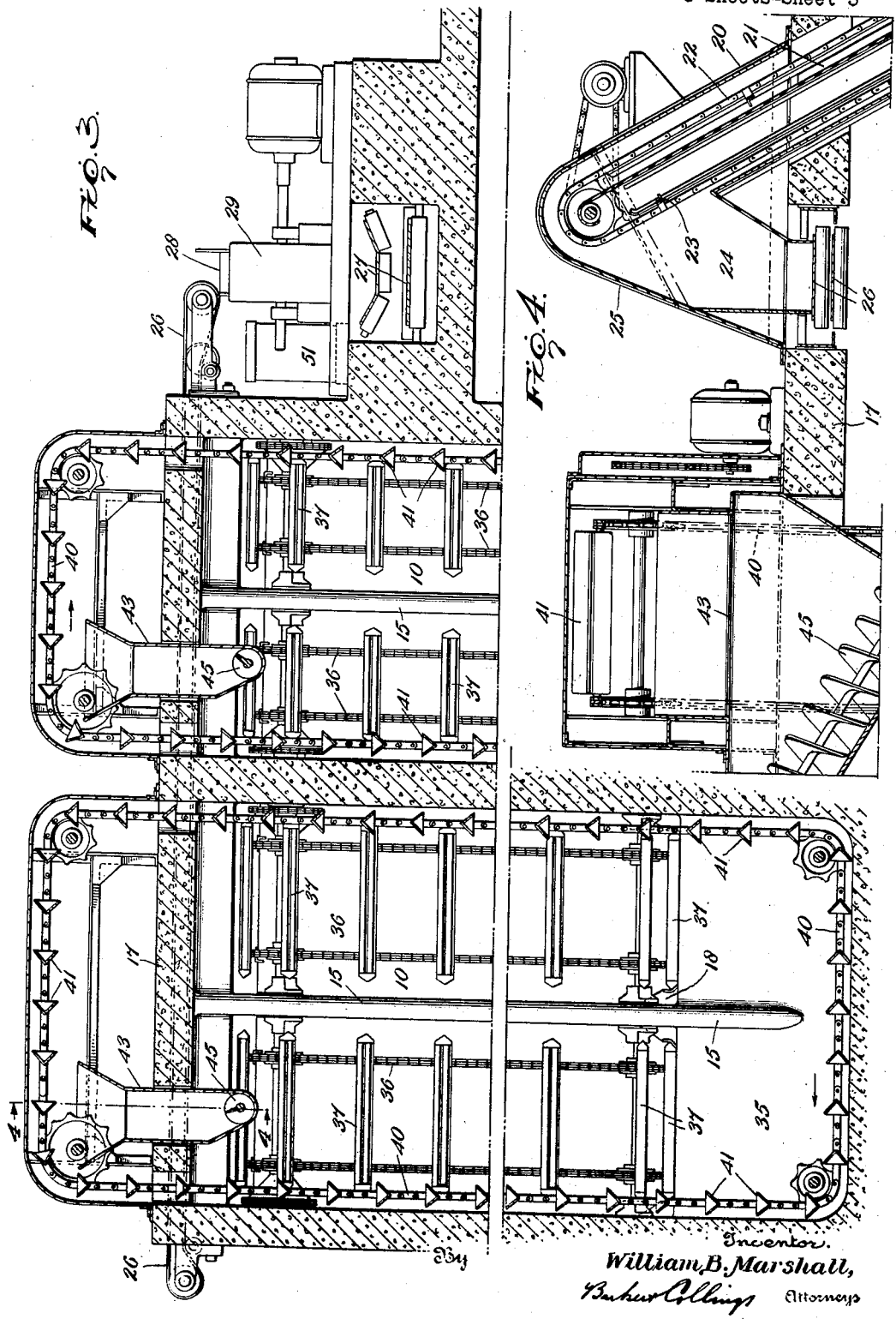
Inventor
William B. Marshall,
Barker Collings Attorneys Patented Sept. 27, 1938

2,131,690

UNITED STATES PATENT OFFICE 2,131,690

SEDIMENTATION APPARATUS

William B. Marshall, Milwaukee, Wis., assignor to Chain Belt Company, Milwaukee, Wis., a corporation of Wisconsin Application March 5, 1937, Serial No. 129,274

2 Claims. (Cl. 210—3)

The invention relates to sedimentation apparatus, of which a sewage disposal plant or system may be cited as a typical example, and has for one of its objects to provide an efficient arrangement of instrumentalities adapted to receive liquids carrying solids of an organic as well as inorganic nature in suspension, and in many cases twigs, leaves, rags, paper, and other floating debris; screen out said floating debris and preferably comminute the same; separate the suspended solids from the liquid, and discharge the latter in a relatively clarified condition; and segregate the organic from the inorganic solids, and discharge them separately for such further treatment or use as specific instances may dictate.

A further object of the invention is to provide an apparatus in which the organics and inorganics are continuously settled out of the liquid, and are continuously or intermittently removed, depending upon their volume, washed, segregated and discharged to eliminate putrefaction of the organics which would occur if they were permitted to accumulate in the apparatus.

With the above and other objects in view which will appear as the description proceeds, the invention consists in the novel details of construction, and combinations and arrangements of parts, more fully hereinafter disclosed, and particularly pointed out in the appended claims.

Referring to the accompanying drawings forming a part of this specification in which like reference characters designate like parts in all the views:

Fig. 2 is a longitudinal sectional view, taken approximately on the plane indicated by the line 2—2 of Fig. 1, looking in the direction of the arrows;

Fig. 3 is a cross sectional view, somewhat enlarged and broken away, taken approximately on the plane indicated by the line 3—3 of Fig. 1; and Fig. 4 is a fragmentary detail sectional view, taken approximately on the plane indicated by the line 4—4 of Fig. 3.

Figure 1:
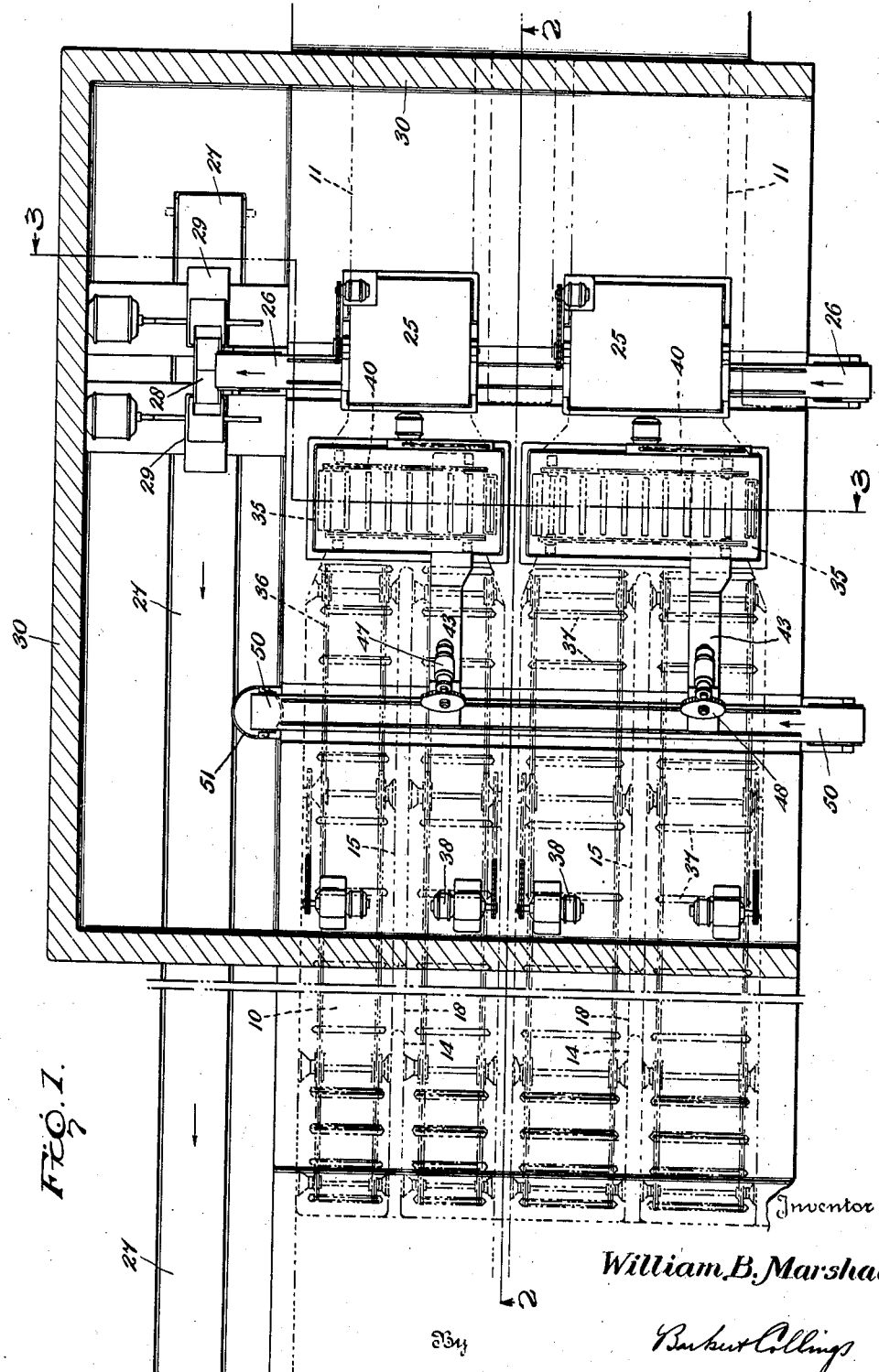
Figure 1 is a plan view, partly broken away and in section, of one form of apparatus constructed and arranged in accordance with the present invention.

The plant illustrated in the accompanying drawings comprises a plurality of elongated rectangular settling chambers 10 disposed side by side and each having an inlet conduit 11 and an outlet conduit 12, the latter being controlled by an adjustable gate or weir 13. Each chamber 10 is provided at its respective ends with the intermediate partitions or division walls 14 and 15 extending from the floor 16 to the roof 17, which partitions are joined at their bottoms by the low division walls 18.

Each inlet conduit 11 is provided with a primary screen structure 20, of any suitable construction, that here shown being of the type shown and described in the prior U. S. Patent No. 1,912,020 granted May 30, 1933, on an application filed by Robert T. Steindorf, to which reference is made for full disclosure thereof. For purposes of the present disclosure, however, it may be said that the said screen structure comprises a bar screen 21, see Fig. 4, positioned and arranged to screen from the incoming liquid floating trash such as twigs, leaves, rags, paper and the like, which debris is automatically removed from the screen bars by an endless conveyor construction 22 carrying scrapers 23 which traverse the face of the screen bars to scrape the accumulated trash therefrom, elevate it, and discharge it through the outlet passage 24 of the screen hood structure 25.

Below the trash outlets 24 of the said screen hoods there is positioned suitable conveying means, here shown as a belt conveyor 26, extending transversely of the conduits 11 and adapted to receive the trash from the scrapers 23 of the screen cleaning mechanism and convey it in the direction shown by the arrows in Fig. 1 to one side of the battery of conduits. Here it may be discharged directly onto a longitudinally extending belt or other conveyor 27, or as is here shown, it may be discharged into a trough 28 which directs it to one or more shredding or comminuting instrumentalities 29. These shredders or comminuters may be of any desired construction, those here shown being of the type described and claimed in the co-pending application of William B. Marshall, filed October 16, 1936, Ser. No. 106,030. As fully disclosed in the said Marshall application, these machines receive the trash or debris and shred or chop it into relatively fine particles, after which it is discharged for such further use as it may be desired to make of it. In the present instance the said shredders 29 discharge the comminuted material upon the longitudinal conveyor 27 by means of which it is conveyed to a point exterior of the building 30 which houses the major portion of the operating mechanism of the plant and is disposed of in any suitable manner.

Each of the settling chambers 10 is provided with a sump or well 35 extending transversely of the chamber to the full width thereof. Each chamber is furthermore provided with means for moving the solids which settle within the chamber, and comprising intermixed organics and inorganics, to the sump 35, such means being here shown as comprising the endless conveyors 36 having the scraper flights 37 which traverse the surface of the floor 16, in the direction indicated by the arrows in Fig. 2, to continuously scrape the settling solids to and into the said sump. The said conveying means may be driven in any usual manner, as for example by means of the motor 38 and chain and sprocket drive 39.

Operating in each sump 35 is a means for constantly collecting and elevating the solids deposited in the sump to a point above the liquid level of the chamber, said means here shown comprising an endless chain conveyor 40 provided with the collecting and elevating buckets or receptacles 41, preferably of V-shape in cross section as clearly shown in Fig. 3. The lower run of these conveyors is positioned adjacent the floor of the sump so that the said buckets traverse the surface thereof to continuously collect the settling organics and inorganics as they are deposited therein by the scraper conveyors 36 and to also continuously elevate the said solids out of the sump and to a point above the liquid level 42 in the chambers. At this point the intermixed organics and inorganics are discharged into a suitable washing and segregating apparatus 43, that here shown being of the type described and claimed in the co-pending application of Robert T. Steindorf, filed August 12, 1936, Ser. No. 95,665. As is fully disclosed in the said Steindorf application, the solids are subjected to the washing action of clean water and to the scouring action of a rotating screw 45 which also serves to elevate the inorganic solids to a discharge conduit 46, while the organics together with the wash water are discharged separately for such further treatment as it may be desired to give them. The screw 45 may be driven by a suitable motor 47 and chain and sprocket or gear transmission 48.

Disposed below the several discharge conduits 46 of the washers 43 is a transverse conveyor 50, here shown as being of the belt type, which is adapted to receive the inorganics discharged from the said washers 43 and convey them in the direction indicated by the arrows in Fig. 1 to a suitable receptacle 51, in which they may be removed for disposal in any suitable manner.

It will be clear from the foregoing that the present construction provides for the clarification of solids-carrying liquids; first, through screening out the larger floating trash and debris which may be shredded and conveyed to a point outside of the building for disposal; and second, through the settling of the finer intermixed organics and inorganics which pass the primary screening means, such settled solids being continuously removed from the floors of the settling chambers to sumps located preferably, although not necessarily, at the inlet ends, the said sumps being provided with transverse collecting and elevating conveyors which continuously remove the intermixed solids deposited in the sumps, elevate them to a point above the liquid level of the chambers where the said solids are washed, segregated and independently discharged for such further treatment or use as particular circumstances may dictate. The continuous removal of the organic solids prevents accumulations thereof in the apparatus, which, by reason of putrefaction, will otherwise give off extremely disagreeable odors.

While one form of the invention has been illustrated and described it is obvious that those skilled in the art may vary the details of construction as well as the precise arrangement of parts without departing from the spirit of the invention, and therefore it is not wished to be limited to the above disclosure except as may be required by the claims.

What is claimed is:

1. Solids removing and treating apparatus for a liquid purification plant having a settling chamber provided with a transverse sump for receiving settled solids, said apparatus comprising a bucket conveyer disposed transversely of said chamber, arranged to enter and continuously collect the solids from all portions of said sump and elevate them to above the level of the liquid in the chamber; a grit washing device fixedly mounted adjacent the chamber arranged to receive the solids from said bucket conveyer; and an endless conveyer arranged to receive and continuously carry the washed grit away from the grit washer.

2. Solids removing and treating apparatus for a liquid purification plant having a plurality of elongated settling chambers each provided with a transverse sump for receiving commingled organic and inorganic solids, said apparatus comprising an endless bucket conveyer for each chamber disposed transversely thereof and arranged to enter its sump and continuously collect solids from all portions thereof and elevate them to above the level of the liquid in the chambers; a grit washing device for each chamber fixedly mounted above said liquid level, arranged to receive the solids from the respective collectors and to segregate the organic from the inorganic solids; and a traveling belt conveyer extending transversely across all of said chambers, arranged to receive and continuously carry away the inorganic solids from all of said washing devices.

WILLIAM B. MARSHALL.